D. NOTEMAN.
Vehicle-Wheel.

No. 214,837. Patented April 29, 1879.

UNITED STATES PATENT OFFICE.

DARIUS NOTEMAN, OF WAUSEON, OHIO.

IMPROVEMENT IN VEHICLE-WHEELS.

Specification forming part of Letters Patent No. 214,837, dated April 29, 1879; application filed October 16, 1878.

*To all whom it may concern:*

Be it known that I, DARIUS NOTEMAN, of Wauseon, in the county of Fulton and State of Ohio, have invented certain new and useful Improvements in Wheels for Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish an improved wheel for vehicles; and it consists in a hub having a double cone-shaped box, adapted to fit and turn on a double cone-shaped spindle, and provided with a series of arms, having in their outer ends sockets for the reception of the inner ends of the spokes, the outer ends of which are screwed into sockets in the centers of the fellies, all arranged to operate as will be hereinafter fully explained.

Figure 1:
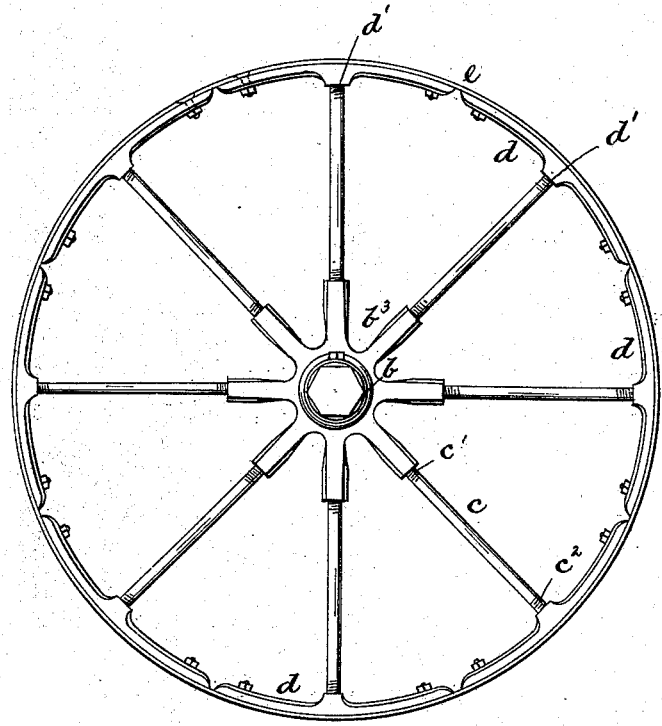
Figure 2:
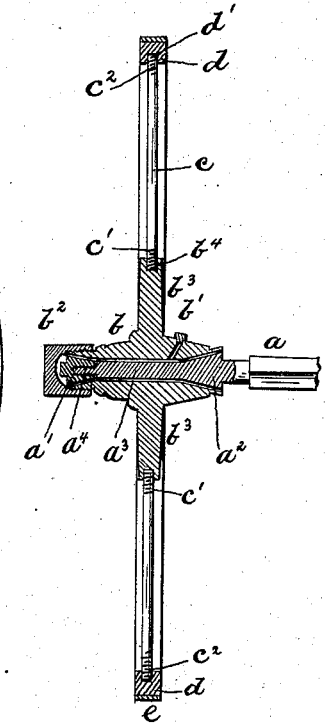
Figure 3:
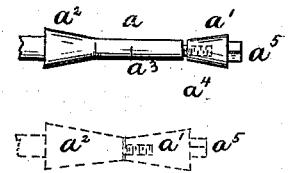

In the drawings, Figure 1 is a side elevation, and Fig. 2 is a cross vertical section, of a wheel constructed according to my invention, and Fig. 3 is the spindle.

$a$ is the spindle, and $b$ the hub. The spindle $a$ is composed of the two cones $a^1$ $a^2$, which are united at their vertices; or the said vertices may be connected by the cylindrical straight part $a^3$. The cones $a^1$ $a^2$ being arranged with their bases outward form a shoulder or enlargement, which prevents the hub from slipping laterally.

The spindle is, by preference, constructed, as shown in full lines, Fig. 3, though it will be clearly understood that it may be constructed as shown in dotted lines in the same figure.

The outer end, $a^1$, is formed in a separate piece, and is provided with a thread, and may be turned onto the threaded pin $a^4$, formed on the end of the part $a^3$, or on the vertex of the rear cone, $a^2$, and it is provided with a head, $a^5$, on which is put a wrench.

The boxing in the hub $b$ is formed so that it will fit neatly to and turn on the spindle $a$, and may be provided with a lubricator, $b^1$, and a cap, $b^2$, as shown.

The form of the spindle and hub is such that the lubricating material will be held within the wheel, and prevented from running out and wasting, as is the case with spindles of common form.

The hub $b$ is provided with a series of arms, $b^3$, having screw-sockets $b^4$, into which the spokes $c$ are turned.

The spokes $c$ have cut on their ends threads $c^1$ $c^2$, which are formed right and left handed, so that when the said spoke is turned in proper direction the fellies $d$ will be drawn in toward the hub $b$.

The fellies $d$ are formed as shown, each being provided with a central screw-socket, $d^1$, into which the outer end of the felly $c$ is turned. To the outer end of the fellies the tire $e$ is bolted, as shown.

When the tire becomes lengthened by the heat of summer or contracted by cold, so as to require an adjustment of the fellies, the proper adjustment can readily be made by turning the spokes in the proper direction. The spokes can very readily be turned with an ordinary pipe-wrench.

A hub and wheel constructed according to my invention and supported on the spindle, constructed as described, will run true, and will not get out of order by wear, as is done in wheels of ordinary construction.

Having thus described my invention, what I claim, and desire to secure by Letters Patent, is—

In a wheel for vehicles, the combination of the solid hub $b$, formed with the double cone-shaped box, adapted to fit and turn on the double cone-shaped spindle $a$, and having the series of arms $b^3$ formed as a part thereof, each of said arms having in its outer end a screw-socket, $b^4$, the spokes $c$, and the fellies $d$, the number of said fellies being the same as the number of spokes $c$ or arms $b^3$, and each provided at its center with a screw-socket, $d^1$, and at its outer ends with suitable means whereby the tire is secured thereto, substantially as and for the purposes set forth.

In testimony that I claim the foregoing as my own I affix my signature in presence of two witnesses.

DARIUS NOTEMAN.

Witnesses:
    THOS. F. HAM,
    E. COOK.